US006801945B2

United States Patent
Lin et al.

(10) Patent No.: US 6,801,945 B2
(45) Date of Patent: Oct. 5, 2004

(54) SYSTEMS AND METHODS FOR PREDICTING TRAFFIC ON INTERNET SITES

(75) Inventors: Long-Ji Lin, San Jose, CA (US); Dz-Mou Jung, San Jose, CA (US)

(73) Assignee: Yahoo ! Inc., Sunnyvale, CA (US)

( * ) Notice: Subject to any disclaimer, the term of this patent is extended or adjusted under 35 U.S.C. 154(b) by 244 days.

(21) Appl. No.: 09/773,471

(22) Filed: Jan. 31, 2001

(65) Prior Publication Data

US 2001/0034637 A1 Oct. 25, 2001

Related U.S. Application Data

(60) Provisional application No. 60/180,379, filed on Feb. 4, 2000.

(51) Int. Cl.$^7$ ................................................ G06F 15/16
(52) U.S. Cl. ........................ 709/229; 709/223; 709/226; 705/10
(58) Field of Search .................................. 705/10, 28, 14; 707/2; 709/223, 224, 220, 226, 229

(56) References Cited

U.S. PATENT DOCUMENTS

| | | | | |
|---|---|---|---|---|
| 5,659,593 A | * | 8/1997 | Tzvieli | 379/13 |
| 5,933,490 A | * | 8/1999 | White et al. | 379/221.01 |
| 6,115,680 A | * | 9/2000 | Coffee et al. | 702/187 |
| 6,115,718 A | * | 9/2000 | Huberman et al. | 707/102 |
| 6,188,673 B1 | * | 2/2001 | Bauer et al. | 370/252 |
| 6,230,153 B1 | * | 5/2001 | Howard et al. | 707/2 |
| 6,597,777 B1 | * | 7/2003 | Ho | 379/133 |
| 6,611,726 B1 | * | 8/2003 | Crosswhite | 700/99 |
| 2001/0013008 A1 | * | 8/2001 | Waclawski | 705/10 |
| 2002/0042821 A1 | * | 4/2002 | Muret et al. | 709/223 |

FOREIGN PATENT DOCUMENTS

JP             11096135 A   *   4/1999   ........... G06F/17/00

* cited by examiner

Primary Examiner—Tariq R. Hafiz
Assistant Examiner—Andre Boyce
(74) Attorney, Agent, or Firm—Townsend and Townsend and Crew LLP; Gerald T. Gray

(57) ABSTRACT

Systems and methods are provided for predicting visitor traffic to a network of web site pages. The systems and methods are used, as an example, to predict the inventory of total available online advertisements available within the network for a forthcoming period. The visitor traffic includes page viewing, listening or transacting on web pages within a web site, wherein the web pages are categorized by subject, interest areas or specific user queries such as word or phrase searches. For each page whose traffic is being predicted, the system takes into account annual seasonality, day-of-week, holidays, special events, short histories, user demographics, user web behavior (viewing, listening and transacting) and parent and child web page characteristics.

27 Claims, 3 Drawing Sheets

SYSTEMS AND METHODS FOR PREDICTING TRAFFIC ON INTERNET SITES

CROSS-REFERENCES TO RELATED APPLICATIONS

This application is related to U.S. Provisional Patent Application Ser. No. 60/180,379 (Atty. Docket No. 017887-003800), filed Feb. 04, 2000, entitled "SYSTEMS AND METHODS FOR PREDICTING TRAFFIC ON INTERNET SITES," the disclosure of which is hereby incorporated by reference in its entirety.

BACKGROUND OF THE INVENTION

For many web portals and Internet Service Providers (ISPs), advertising is a major source of revenue. One form of advertising involves showing advertisers' ad banners on displayed web sites. For example, a preeminent portal such as Yahoo! displays advertisers' ads on web sites. In return, the advertisers pay a fee for each ad viewed by web users. Contracts to show ads are normally signed several weeks or months before ads get delivered and are often expressed in terms of page views. The duration of contracts typically ranges from one day to multiple years.

There are typically several types of web advertising contracts, including regular contracts, exclusive contracts and infinite contracts. Generally, for regular contracts, the advertisers purchase a designated number of ad views on a chosen space (web page or collection of pages), for exclusive contracts, advertisers purchase all the ad views on a chosen space, and for infinite contracts, advertisers purchase all the leftover ad views on a chosen space after other regular contracts related to that space have been fulfilled.

An advertising contract can also be entered into for searches related to a designated search word or phrase, whereby the contracted for ad is shown on a search results page when the contracted for search word or phrase is used. For example, when a user searches for "Pokemon" and an advertiser has contracted for the display of one of its ads on such search results page, that ad is displayed on the search result page. Inventory prediction is useful to predict how many times a word or phrase will be searched for in the future as the number of search results pages available for ads depends on the number of searches done.

Before entering into an advertising contract, it is advantageous to ensure that all the designated ad views can be successfully delivered during the contract period. If a space is oversold, the advertisers would not be happy, and if a space is undersold, revenue would be lost by not delivering ads on the space or by giving away the views to an infinite contract. Therefore, it is important to accurately predict the number of page views to be consumed in the future. This is called inventory prediction. In general, it is desirable to predict the total inventory available, e.g., on an entire network such as the Yahoo! network, as well as the inventory available for each space.

Accordingly, it is desirable to provide an inventory prediction system (IPS) that takes into account and efficiently addresses the above and other issues.

SUMMARY OF THE INVENTION

The present invention provides inventory prediction systems and methods that overcome problems associated with inventory prediction for page views.

According to the embodiments of the present invention, systems and methods are provided for predicting visitor traffic to a collection of web site pages. The systems and methods are used, as an example, to predict the inventory of total available online advertisement slots available within the network for a forthcoming period. The visitor traffic includes page viewing, listening or transacting on web pages within a web site, wherein the web pages are categorized by subject, interest areas or specific user queries such as word or phrase searches. For each page whose traffic is being predicted, the system takes into account annual seasonality, day-of-week, holidays, special events, short histories, user demographics, user web behavior (viewing, listening and transacting) and parent and child web page characteristics.

According to an aspect of the invention, a computer implemented method is provided for predicting inventory for web spaces in a network of spaces. The method typically comprises generating historical data for a first web space based on records of daily activity for the first web space and any descendent spaces of the first web space. The method also typically comprises predicting inventory for the first web space based on the historical data generated for the first web space. Predictions are typically performed by applying to the historical data at least one of a growth and seasonality separation (GSS) process, a trend copy (COPY) process, a model inheritance process, a linear trend estimation (LTE) process and a moving average process.

According to another aspect of the invention, a system is provided for predicting inventory for web spaces in a collection of related web spaces. The system typically comprises a historical data generating module that produces historical data for web spaces, wherein the historical data generating module produces historical data for a first web space based on records of daily activity for the first web space and for descendent spaces of the first web space in the collection. The system also typically comprises an inventory predicting module that predicts inventory for the web spaces, wherein the inventory predicting module processes the historical data for the first web space and generates an inventory prediction for the first web space.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DESCRIPTION OF THE SPECIFIC EMBODIMENTS

The systems and methods of the present invention will be described herein with reference to the specific example of the Yahoo! network of spaces, however, it is understood that any other network structure or collection of space can be used with the teachings of the present invention. As used herein, a "space" is a page object or event with which an advertisement can be viewed or otherwise presented.

In the specific example of the Yahoo! network, Yahoo! web pages are organized in a tree structure. At the top of the tree is the entire Yahoo! network (URL: http:/www.Yahoo.com/). Under this node are various nodes, such as Yahoo! Shopping (shopping.Yahoo.com), Yahoo! Sports (sports.Yahoo.com), Yahoo! Yellow Page (yp.Yahoo.com), Yahoo! Search, etc. Under each of these nodes there may be a variety of descendent nodes, each of which may also have a variety of descendent nodes. For example, under the Yahoo! Sports node are the NFL, NHL, NBA, MLB, etc. nodes, and under the NBA node are Standing, Statistics, Games, etc. nodes, and so on. Search result pages are also included as part of the tree. For instance, under the Yahoo! Search node are all the result pages from search words that are entered on the Yahoo! front page.

Figure 3:
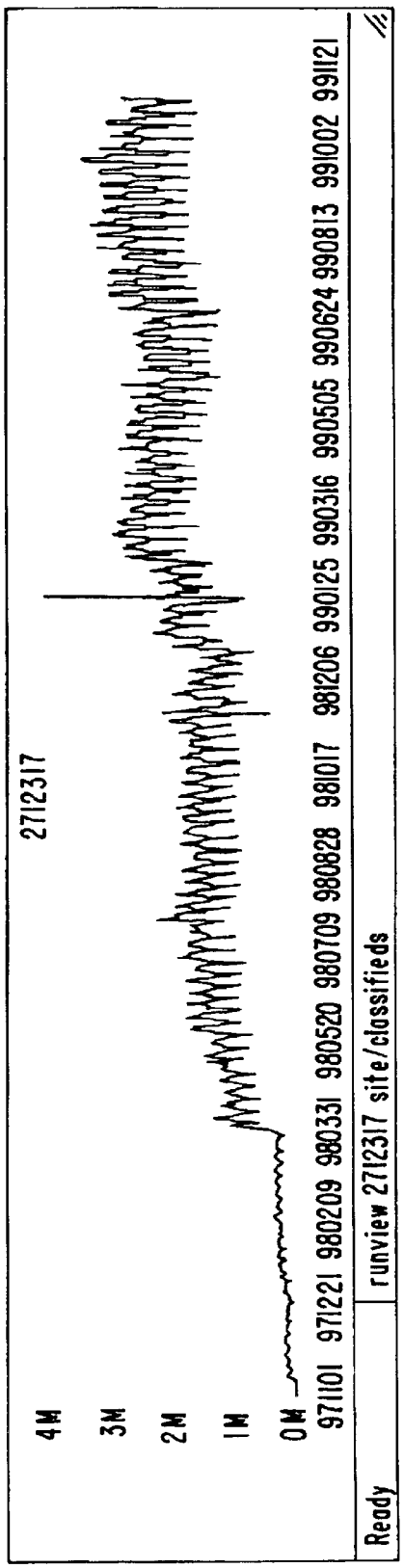
FIGS. 3 and 4 show runview histories of two spaces with different characteristics.
Figure 4:
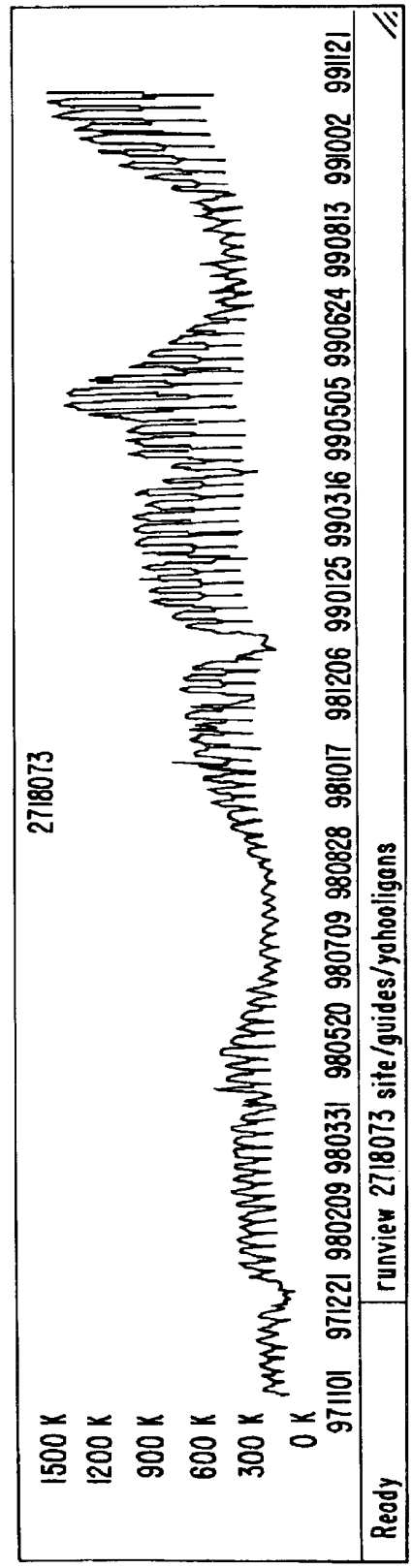

As used herein, each node, or web page, in a tree structure such as the Yahoo! tree structure will be referred to as a "space." For each space, it is desirable to predict at least two types of inventory: number of pageviews and number of runviews. The number of pageviews of a space is the number of visits to the corresponding web page. The number of runviews of a space S is the sum of pageviews of S and S's descendent spaces as defined by the tree. Runviews are useful because an advertiser can choose to show their ads only on a designated space, or to show their ads on a space S as well as all descendent spaces under S. For example, FIGS. 3 and 4 show examples of runview histories of two spaces with different characteristics.

Inventory prediction is a difficult task for which many issues need to be addressed, including the following:

1. The Internet is growing rapidly, and it is hard to accurately predict how fast the traffic will be growing in the future.
2. Unpredictable one-time events may dramatically change the traffic to certain spaces. Although it is impossible to predict one-time events in advance, those traffic changes should be identified as unrepeatable, as opposed to repeatable changes such as traffic changes on holidays.
3. For many spaces, there is often a distinct intra-week traffic pattern repeated every week. The percentage of each weekday's traffic in a week is almost a constant for a long period of time. This knowledge should be efficiently used.
4. Holiday effects exist. For example, traffic typically drops on holidays (especially Christmas). Some holidays (like Christmas, Independence Day) are fixed to a date, while the others (Labor Day, Good Friday) are floating. Additionally, even though Independence Day is always on July 4, the effective holiday may start on July 3 when July 4 is a Saturday.
5. Seasonal effects exist. For example, traffic to certain spaces (such as those for students) may drop significantly during the summer time.
6. There may not be much history to work with for a particular space. For example, many spaces might be less than one year old. With little history, it is hard to predict the holiday/seasonal effects for one year based solely on what happened during the previous year. Also, many existing time series prediction methods may not work with so little history.
7. The tree structure may have been regularly modified. New tree nodes may have been inserted, and some may have been removed. Also, nodes may have been moved from one place to another, and a node may have been split into two new nodes. Such changes often affect the number of pageviews and/or runviews of certain existing spaces in the future. For instance, when a new service (corresponding to a descendent of space S) is launched, the number of runviews of space S may double on that day and thereafter. When a descendent of space S is moved out to form a new space, the number of pageviews of S may drop by a certain percentage, e.g., 50%, on that day and thereafter.
8. If changes to the tree structure occur quite often, inventories should be repredicted for each space often, e.g., once a week. The Yahoo! network, for example, exceeds 3 million spaces, although only a small percentage of these spaces might be considered really important. This requires the prediction system to be computationally efficient and mostly (if not fully) automatic.

Figure 1:
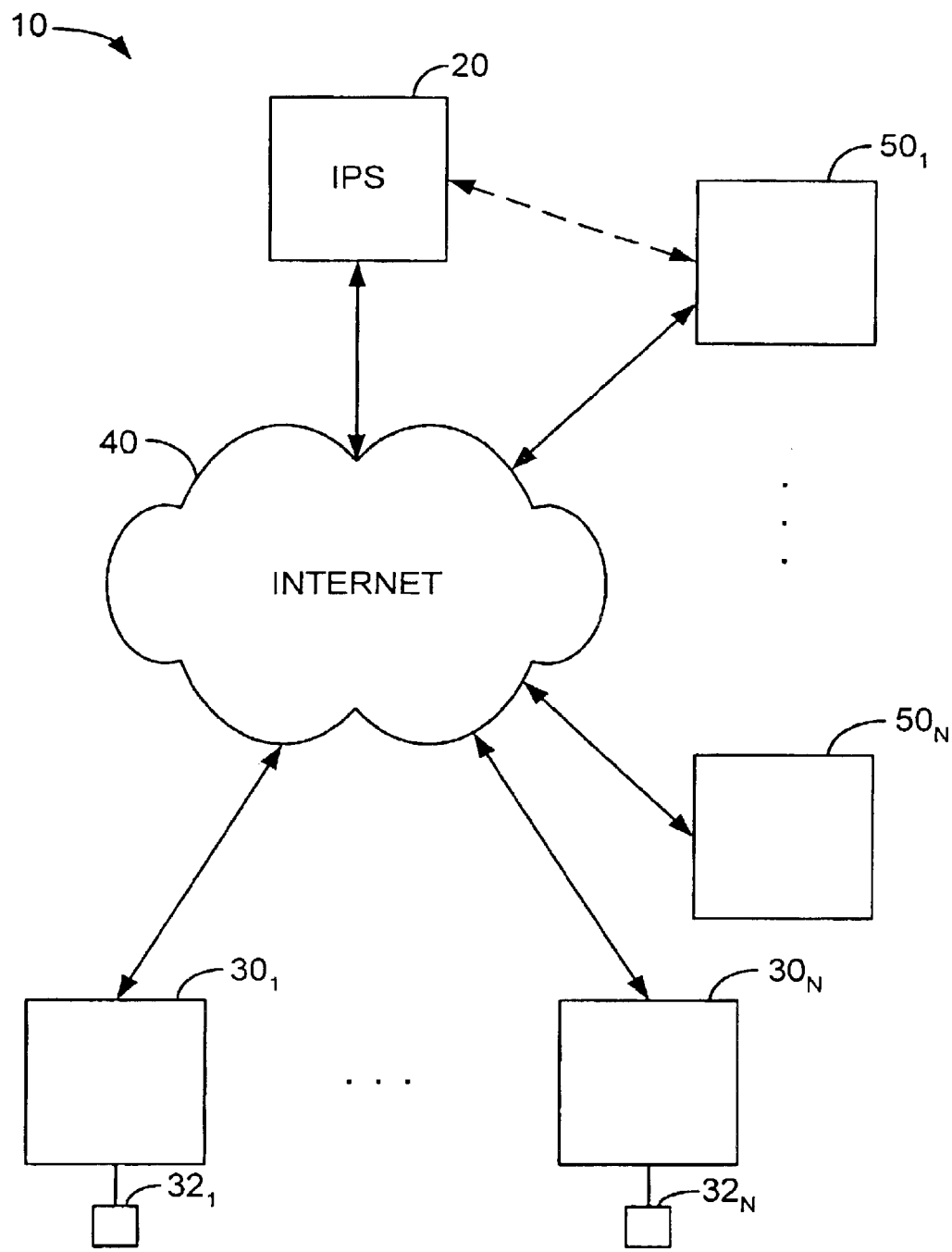
FIG. 1 illustrates a general overview of an information retrieval and communication network including an inventory prediction system according to an embodiment of the present invention.

FIG. 1 illustrates a general overview of an information retrieval and communication network 10 including an inventory prediction system 20, web servers $50_1$ to $50_N$, and client devices $30_1$ to $30_N$, according to an embodiment of the present invention. In computer network 10, clients $30_1$ to $30_N$ are coupled through the Internet 40, or other communication network, to servers $50_1$ to $50_N$. Only one computer system representing inventory prediction system 20 is shown, but it should be understood that more than one computer system can be used to implement inventory prediction system 20, either individually or in a distributed manner. Additionally, inventory prediction system 20 might be implemented as one or more server 50. Further, other computer systems and components providing additional functionality might also be interconnected to any component shown in network 10 either directly, over a LAN or a WAN, or over the Internet.

Several elements in the system shown in FIG. 1 are conventional, well-known elements that need not be explained in detail here. For example, each client device 30 could be a desktop personal computer (PC), workstation, cellular telephone, personal digital assistant (PDA), laptop, or any other device capable of interfacing directly or indirectly with the Internet. Each client 30 typically runs a browsing program, such as Microsoft's Internet Explorer program, Netscape's Navigator program or the like, or a microbrowser such as a WAP enabled browser in the case of a cell phone, PDA or other handheld wireless devices, allowing a user of client 30 to browse pages and forms available to it from servers $50_1$ to $50_N$ or other servers over Internet 40. Each client device 30 also typically includes one or more user interface devices 32, such as a keyboard, a mouse, touchscreen, pen or the like, for interacting with a graphical user interface (GUI) provided by the browser on a display (e.g., monitor screen, LCD display, etc.) in conjunction with pages, forms and data provided by servers $50_1$ to $50_N$ or other servers. The present invention is suitable for use with the Internet, which refers to a specific global Internet-work of networks. However, it should be understood that other networks can be used instead of the Internet, such as an intranet, an extranet, a virtual private network (VPN), a non-TCP/IP based network, any LAN or WAN or the like.

Inventory prediction system 20 is preferably implemented using a PC or workstation including one or more user interface devices and storage devices and a display, although a portion or all of inventory prediction system can be implemented using one or more server 50. According to one embodiment as will be described in more detail below, inventory prediction system 20 and any related components are operator configurable using an application including computer code run using a central processing unit such as an Intel Pentium processor or the like. Computer code for operating and configuring inventory prediction system 20 as described herein is preferably stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, digital video disk (DVD) medium, a floppy disk, and the like. Additionally, the entire program code, or portions thereof may be downloaded from a software source to inventory prediction system 20 over the Internet as is well known, or transmitted over any other conventional network connection as is well known, e.g., extranet, VPN, LAN, etc., using any communication medium and protocols (e.g., TCP/IP, HTTP, HTTPS, Ethernet, etc.) as are well known. Additionally, portions of the program code may be downloaded or provided to client device 30 and executed on client device 30.

In general, users access and query servers $50_1$ to $50_N$, and other servers through client devices 30 to view and download web pages and content including news stories, advertising content, search query results including links to various websites and so on. Such content can also include other media objects such as video and audio clips, URL links, graphic and text objects such as icons and hyperlinks, forms, pages and the like. Additionally, such content is typically presented to the user as web pages formatted according to downloaded JavaScript code and HTML code and data as is well known. In general, any instance of Standard Generalized Markup Language (SGML), including XML, WML, HDML (for hand-held devices), DHTML, and others, may also be used.

Figure 2:
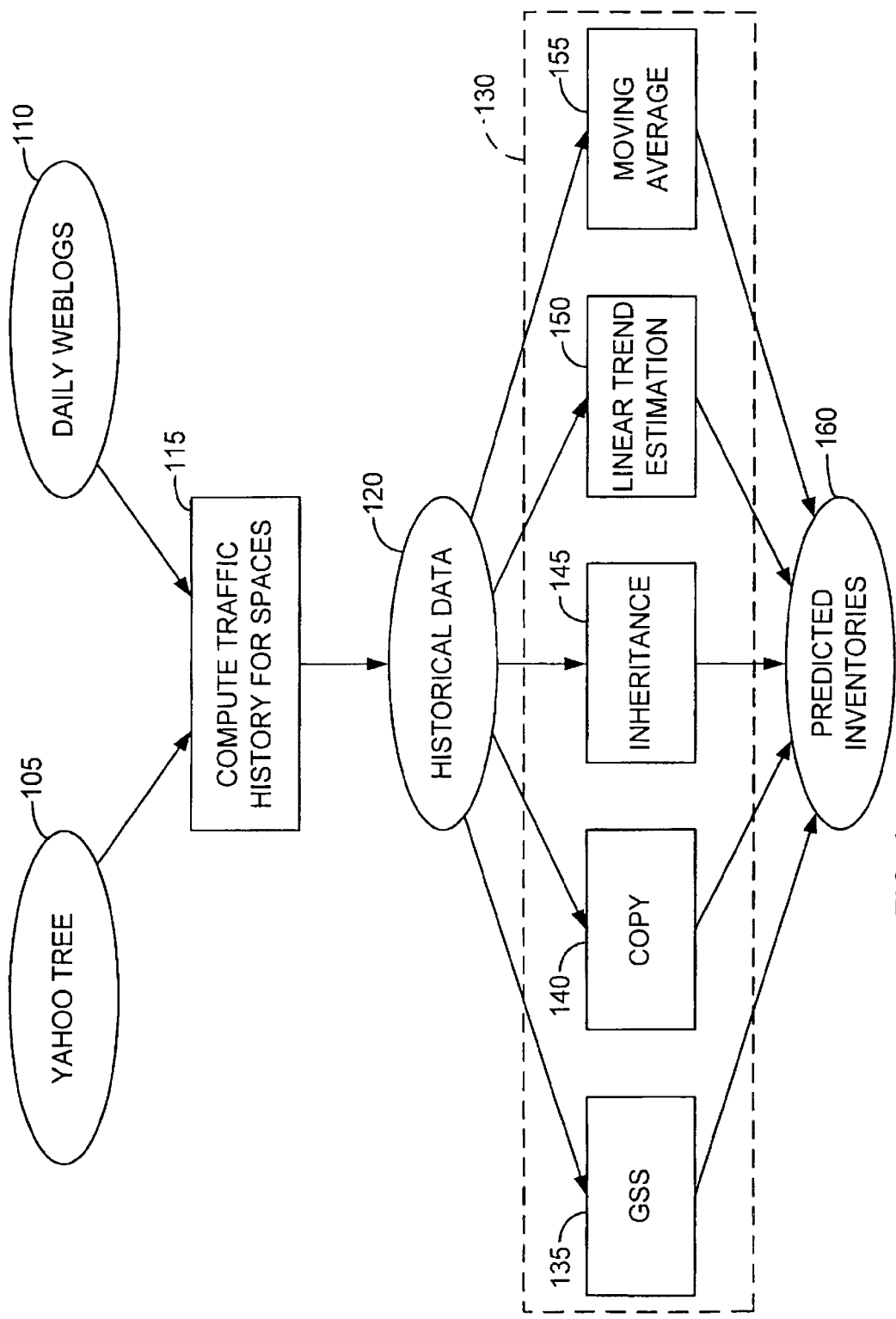
FIG. 2 illustrates an inventory prediction system according to an embodiment of the present invention.

According to one embodiment of the present invention, Inventory Prediction System (IPS) 20 includes two main components as shown in FIG. 2: an historical data generation component 115 and an inventory prediction component 130. Inventory prediction module 130, according to one embodiment, includes a GSS module 135, a COPY module 140, an Inheritance module 145, a Linear Trend Estimation Module 150 and a Moving Average module 155, each of which implements corresponding prediction processes as will be described in more detail below. It will be appreciated that historical data generation component 115, inventory prediction component 130 and any components thereof may be implemented using a single computer system (e.g., PC, workstation, server, etc.) or distributed across two or more computer systems.

Historical data generation module. For predictions to be made, historical data are needed to extrapolate what will likely happen based on what happened before. According to one embodiment, historical data generation module 115 generates historical data 120 using as input tree structure 105, and the daily weblogs 110. The daily weblogs 110 are records of traffic to each space compiled each day and provided by the various web servers in the network, e.g., many of servers 50 in FIG. 1. Historical data 120 preferably include pageview and runview histories (pageviews and runviews) for each major space. For each space, historical data generation module 115 is able to produce a pageview based on the daily weblog for the space, however, knowledge of the relationship among spaces (in this particular case, knowledge of tree structure 105) is necessary for computing a runview, because a space's runview is the sum of pageviews of its descendants. In one embodiment, for a given space, historical data are re-generated periodically using the current tree structure before a prediction is made. FIGS. 3 and 4 illustrate examples of runviews for two different spaces.

Inventory Prediction. According to one embodiment, five different types of prediction processes are used: Growth & Seasonality Separation (GSS), Trend Copy (COPY), Model Inheritance, Linear Trend Estimation (LTE), and Moving Average. The COPY process is preferred for predicting inventories that have very dramatic seasonable fluctuations. For instance, the traffic to the Yahoo! NFL sports site can be as low as 30,000 pageviews per day during the off-season, and can reach as high as 2,000,000 pageviews per day during the football season. The GSS process, on the other hand, is preferred for regular spaces/search words with less severe fluctuations. In cases where neither GSS nor COPY works well, the Model Inheritance process, or in some cases, the LTE process can be used. If none of the above processes is applicable, the simple Moving Average e can be used. These processes will be described in more detail below.

Adjusting the Historical Data for Tree Reorganization

As mentioned above, reorganization of the tree structure 105 can result in dramatic discontinuity in the traffic history. As can be seen in FIG. 3, for example, when a new service was added to a space, the runviews increased several fold overnight. Without knowing that this increase was a special event, any prediction process is likely to be tricked into predicting a similar increase the next year around the same date (e.g., March 31), which would be wrong.

According to one embodiment, such discontinuities are 'removed' from the historical data input to inventory prediction module 130. For example, suppose it is known that there is a discontinuity around Mar. 31, 1998. According to one embodiment, the magnitude M of the sudden increase (or decrease in some cases) is estimated by computing the traffic change (in percentage) from the week before Mar. 31, 1998 and the week after. All the pageview/runview numbers before Mar. 31, 1998, can then be 'raised' (or 'lowered') by the same amount M. By doing so, the history looks smoother and is more useful for any prediction process. Dates of discontinuities may be manually provided. Alternatively, various heuristics or other processes may be used to automatically detect major discontinuities in the historical data.

Another issue concerns missing data. In some cases, the logging process may have failed or an error may have occurred, resulting in missing pageview data for certain spaces on certain days. This might happen during tree reorganization or launching of new services. The methods described herein assume no missing data, however. If data are missing for a long period of time (say, 2 weeks or more), then according to one embodiment, all the data before the missing period is discarded. Otherwise, for each missing day the data are filled in with the average number of pageviews/runviews a week before and after.

GSS Process

Given the traffic history for an input space, GSS module 135 implements a GSS process to predict future inventories. The GSS process according to one embodiment predicts inventories by performing some or all of the following operations:

Operation 1: Detect and remove one-time spikes and dips from the historical data.

An earthquake, for instance, may cause the traffic to certain "news" spaces to rally, while the traffic may drop to nearly zero when a computer server is down due to technical problems. According to one embodiment, this operation includes the following sub-operations:

a) For each day D, determine if the number of views on day D (denoted by V(D)) is abnormally large or small.

This is done in one embodiment by checking if V(D) is more (or less) than X% larger (smaller) than V(D−7) and V(D+7) where X is a threshold such as 30, 40 or 50.

b) For each day D that is determined to be 'abnormal' in (a) above, determine whether any 'abnormal' day is also observed approximately one year before or after the day D. If the abnormal traffic on day D was not repeated, then some major one-time event most likely occurred on that day.

c) If the traffic on day D is determined to be a one time event, remove the one-time event by setting V(D) to (V(D−7)+V(D+7))/2.

Operation 2: Model holiday effects and 'remove' them.

This operation deals with normal traffic changes on holidays. When a holiday falls on a Saturday or Sunday, for example, the neighboring Friday or Monday effectively becomes the holiday. The GSS process thus requires a holiday list to perform this operation. Holidays, and other significant days, can be listed as long as there is a repeatable traffic change on that day year after year. For instance, April 14/15 is treated like a holiday, because the traffic to the tax-related spaces increases dramatically on those days. Note that different countries can have different national holidays. To make it general, in one embodiment, each space is given its own holiday list.

According to one embodiment, this operation includes the following sub-operations:

a) For each holiday H, compute the percentage change of traffic from a week prior (H−7) to day H. Save the percentage, which will be used in operation 7 below.

b) For each holiday H, replace V(H) with V(H−7).

Operation 3: Model day-of-week effect and 'remove' it.

This operation deals with the distinct intra-week traffic pattern repeated every week. According to one embodiment, this operation includes the following sub-operations:

a) For each weekday (i.e., Sunday to Saturday), compute that percentage of the total traffic per week that falls on that weekday over the past 6 months. Save the percentage, which will be used in operation 6 below.

b) For each day D, replace V(D) with the average traffic during the week of day D.

Operation 4: Model long-term growth and seasonal fluctuations in traffic.

Suppose the traffic increases from day A (say, July 1) to day B (say, October 1) by X%:

$$V(B)=V(A)*(1+X\%). \quad (1)$$

This increase may be attributed to several factors including: (1) the number of web users has been steadily increasing over the years, and (2) people tend to use the Internet more often in October than in July, since people like to spend the summer outdoors. Let G be the long-term growth rate and S the seasonal change. In one embodiment, the traffic change X into G and S is stated as follows:

$$(1+X\%)=(1+G\%)*(1+S\%) \quad (2)$$

For a given pageview history and a given look-ahead (3 months, in the example above), X can be directly computed for the days in the past. To determine G and S in the past, however, is generally more difficult. Assume G is a function of time such as:

$$G(t)=a+b*t, \text{ or} \quad (3a)$$

$$G(t)=a+b*\exp(-t)+c*t*\exp(-t) \quad (3b)$$

where t is time. Normally G(t) starts large (i.e., high growth initially) and gradually decreases (to little long-term growth after a few years). Variations of the functions or entirely different ones can be used.

There are a few free parameters in G(t): a, b, and c. Given sufficient history of X(t), a nonlinear-function regression method, for example, the Levenberg-Marquardt process, may be used to determine the free parameters by minimizing the differences between G(t) and X(t). Once G(t) is determined, S(t) can be easily calculated using Equation (2).

Operation 5: Predict inventories before day-of-week & holiday effects.

In operation 4, a model of long-term growth as a function of time G(t) was obtained. By replacing t with future time, an estimate of the long-term growth rate for any given future day can be obtained. In operation 4, a model of seasonal traffic S(t) was also obtained. Assuming that the seasonal pattern from the previous year(s) will repeat in the coming years, an estimate of future traffic fluctuations due to seasonal effects can be obtained. Using Equations (1) and (2), the future inventories, which still may need to be compensated for day-of-week effects and holiday effects, can be computed.

To avoid inventories being oversold, one may prefer to underestimate, rather than overestimate, the inventories available. Therefore, in one embodiment, for some spaces and search words, a discount is applied to G(t) when G(t)>0 (and to X(t) when X(t)>0). An appropriate discount is determined in one embodiment by backtesting several different discount values and choosing the best one.

Operation 6: Apply the day-of-week model.

Using the day-of-week model from operation 3, the results from operation 5 can be adjusted such that the predicted daily inventories show the same intra-week traffic pattern as before, while keeping the 7-day moving average of the predicted inventories unchanged.

Operation 7: Apply the holiday model.

Using the holiday models from operation 2, the prediction results from operation 6 are adjusted such that the same traffic increase/decrease (in terms of percentage) on holidays as happened before is obtained. For instance, suppose the traffic on Labor Day of 1998 (September 7) dropped by 30% from the previous week. Then the traffic on Labor Day of 1999 (September 6) is predicted to decrease by the same percentage from its previous week.

Note that the holiday effects are first taken out from the traffic history. The future traffic is then estimated, and the holiday effects are put back into the traffic prediction. In this way, the problem that holidays can be observed on different dates in different years is efficiently resolved.

COPY Process

Given the traffic history for an input space, COPY module 140 implements a COPY process to predict future inventories.

For some spaces, the GSS process may not perform well. For instance, the traffic on many sports related spaces are often subject to dramatic increases or decreases (e.g., as much as a hundred-fold or more) at the beginning or end of the sport season. In such cases, estimates of long-term growth rates by the GSS process may be too inaccurate to be useful. The COPY process is preferably designed to be complimentary to the GSS process. The idea behind the COPY process is as follows. Assuming the sport season starts (and ends) about the same day (of the year) year after year, future inventories are predicted to be exactly the daily pageview numbers from the past, multiplied by a first constant factor, plus a second constant factor. The first constant factor represents the expected traffic growth (or decrease) from the previous year to the following year.

Some spaces may only be one year old or even younger, hence they have no history from a year ago for the COPY process to copy from. For such a space S, the past traffic trend is copied from the parent space of S as defined by the Yahoo! tree. For instance, S might be the space of NBA team statistics (site/sports/nba/stats), and its parent space is NBA main page (site/sports/nba). It is reasonable to assume both spaces would have similar traffic patterns. This copying of a trend from a parent space can be further generalized: the trend from any of the antecedent spaces can be copied, as long as S and the chosen antecedent space have similar trends in the past.

Given a space S, the COPY process according to one embodiment, predicts its inventories as follows:

Operation 1: Find space A from which to copy the trend.

The similarity of the traffic trends of spaces S and A can be determined by normalized correlation:

$$N = (E(P\ Q) - E(P)\ E(Q))/\mathrm{Sigma}(P)\ \mathrm{Sigma}(Q) \quad (4)$$

where

P is the recent traffic history of space S, represented by a vector,

Q is the history of space A in the same time period as P but one year older, $E(x)$ is the mean of all elements in vector x, $E(P\ Q)$ is the result of the $E()$ operator applied to the product of P and Q, and $\mathrm{Sigma}(x)$ is the standard deviation of all elements in vector x.

Note that the normalized correlation score is always between −1 and 1.

The candidates for space A include space S itself and all its antecedent spaces. A is preferably chosen to be the one with the strongest normalized correlation with space S.

Operation 2: Detect and remove one-time spikes and dips from the historical data of A and S.

This operation is similar to operation 1 of the GSS process, but it is applied to space A (in other words, Q), as well as space S (in other words, P).

Operation 3: Model space S with space A.

The time series P (represented by a vector) is approximated by $$P' = r + s\ Q \quad (5)$$

where r is a constant, to be added to each element of vector P', and s is a multiplication factor to be applied to each element of vector Q. The free parameters r and s can be determined by minimizing the differences between P and P', for example, using the same nonlinear optimization method used by the GSS process at Step 4. There can be many variations of this method. For instance, one may choose to optimize the mean-squared differences between P and P', or one may optimize some weighted mean-squared differences, with differences at more recent times being weighted more.

An example will now be used to illustrate how the model obtained above can be used to predict future inventories. Suppose the time frame of P (S's history) is from January 1 to Aug. 1, 1999. The optimization method is applied to obtain the values for r and s (see Equation 5). Space S's inventories starting from Aug. 2, 1999 are hence predicted to be $$P'' = r + s\ R \quad (6)$$

where R is the traffic of space A from Aug. 2, 1998 up to the last day of the historical data.

Choosing between GSS and COPY

Both GSS and COPY make predictions. GSS performs better for some spaces, while COPY performs better for other spaces. To determine which process to use for a given space, according to one embodiment, both processes are backtested against the historical traffic data. The process that works better in the past for each given space is used for predictions, assuming that that process will continue to work better in the future. If the backtest results indicate unsatisfactory performance from either process in the past, then neither process is used. Instead, the Model Inheritance process, the Linear Trend Estimation process, or the Moving Average process, as will be discussed below, is used.

Model Inheritance Process

Given the traffic history for an input space, Inheritance module 145 implements a Inheritance process to predict future inventories.

When both GSS and COPY do not perform well (according to backtest results) for a given space S, another assumption can be made; that is, the traffic change (in percentage) from the latest week to any future day will be the same for space S and its parent space A. Hence, inventory predictions for space S are provided, if predictions for space A are provided using either the GSS or the COPY process. If no predictions for space A exist, then the prediction model from A's parent (i.e., grandparent of S) is 'borrowed'. This "inheritance" of prediction model is preferably done recursively until the entire Yahoo! tree 105 is traversed in the top-down order.

It is preferable to have at least 365 days worth of predictions for each major space. For spaces that do not have sufficient history, the GSS or the COPY process may not be able to generate all 365 days worth of predictions. In such cases, the Inheritance method may be used to obtain predictions for the missing days. Therefore, in one embodiment, for example, it is possible that the first 200 days of predictions are generated by GSS module 135 as applied to space S, the next 100 days are generated by GSS module 135 as applied to S's parent, and the last 65 days generated by COPY module 140 as applied to S's grandparent.

Linear Trend Estimation (LTE) Process

Given the traffic history for an input space, LTE module 150 implements a LTE process to predict future inventories.

When the history of a space S is too short (e.g., less than one year long), the GSS method is generally not sufficient. If the history of S does not correlate well with the history of its antecedents, then the COPY method may not be sufficient as well. The Model Inheritance Method can then be applied, although it may not perform well because the traffic trend of S may not be quite similar to that of its antecedents in the past as the correlation score already indicated. Linear Trend Estimation (LTE) is provided as an alternative to Model Inheritance in one embodiment.

One basic assumption behind LTE is that traffic to a young space may continue to grow linearly, at least for the near term, at the same rate that it has enjoyed in the past. One step of LTE is to find the linear growth rate of the past and use it to project future traffic.

Given a space S, LTE predicts inventories by performing some or all of the following operations according to one embodiment:

Operation 1: Model holiday effects and 'remove' them.

This operation is similar to operation 2 of the GSS process above.

Operation 2: Model day-of-week effect and 'remove' it.

This operation is similar to operation 3 of the GSS process above.

Operation 3: Find the linear growth rate of the past.

Removing the day-of-week effect is essentially equivalent to calculating the 7-day moving averages of the historical data. Now perform linear regression on the entire moving averages, and save the slope of the best-fit line. Next, on a window of the moving averages that span from, e.g., 60 days ago to yesterday, a) perform linear regression and save the slope of the best-fit line in this window;

b) slide the window by, e.g., 15 days back in time;

c) repeat a)-b) multiple times, e.g., 10 times or more.

Let the median of the slopes gathered in the above operations be m, which represents that the traffic of space S grew by m page views per day in the past.

Operation 4: Predict inventories before day-of-week & holiday effect.

Let the most recent 7-day moving average be p, and the projected page views of k days from now be q. Then q=p+m*k. If it is desired to be more conservative in projecting the future growth, attenuate m over time, for instance, by multiplying m by an attenuation factor of 0.8 every 4 weeks (28 days). For example, for k between 56 and 84 days, the projected pageviews are:

$$q=p+m*28+(m*0.8)*28+(m*0.8*0.8)*(k-28-28).$$

Alternatively, rather than arbitrarily picking an attenuation factor (0.8) and schedule (every 4 weeks), the attenuation factors are found from S's parent space. In general, an attenuation factor other than 0.8 may be used.

Operation 5: Apply the day-of-week model.

This operation is similar to operation 6 of the GSS process above.

Operation 6: Apply the holiday model.

This operation is similar to operation 7 of the GSS process above, but with some complication. Recall that space S has less than one year's worth of historical data, e.g., ranging from Aug. 1, 1999 to Feb. 22, 2000. In this example, the percentage change of traffic due to Independence Day is not known because S has not seen this holiday since its inception. In one embodiment, the parent's percentage of traffic change for the holiday is copied or if not available, the average percentage change of traffic for all holidays that have occurred in S's history is used.

Moving Average Process

Given the traffic history for an input space, Moving Average module 155 implements a Moving Average process to predict future inventories.

In some rare situations where none of the four methods described above are useful, a default Moving Average process may be used. Assuming that the traffic will remain the same throughout the future, in one embodiment the future traffic is simply predicted to be the average traffic in the latest two weeks.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. For example, it should be apparent that different time periods may be used throughout. For example, when computations are performed using traffic for a day, week, month, etc., before or after a given day, any other time period may be used as is practical. Therefore, the scope of the appended claims should be accorded the broadest interpretation so as to encompass all such modifications and similar arrangements.

What is claimed is:

1. A computer implemented method of predicting inventory for web spaces in a network of spaces, comprising:

automatically generating historical inventory data for a first web space based on records of daily traffic for the first web space and descendent spaces of the first web space; and automatically predicting future inventory using a computer system for the first web space based on the historical inventory data, wherein predicting includes:

identifying a holiday; and removing from the historical inventory data fluctuations in traffic due to the holiday, wherein removing includes replacing the data for the holiday in the historical inventory data with the data from a prior day.

2. The computer implemented method of claim 1, wherein the step of predicting includes applying to the historical inventory data at least one of a growth and seasonality separation (GSS) process, and a linear trend estimation (LTE) process.

3. The computer implemented method of claim 1, wherein the step of generating historical inventory data includes generating a pageview for the first web space.

4. The computer implemented method of claim 1, wherein the step of generating historical inventory data includes generating a runview for the first web space, wherein the runview is a sum of pageviews of the first web space and pageviews of the first web space's descendents.

5. The computer implemented method of claim 1, wherein the prior day is seven days prior to the holiday.

6. The computer implemented method of claim 1, wherein the step of predicting includes: for each day, replacing in the historical inventory data the traffic for that day with the average traffic during the week of that day.

7. The computer implemented method of claim 1, wherein the step of predicting includes determining a long term growth rate based on a traffic increase during a period of time; and thereafter determining a seasonal change rate based on the determined long term growth rate and the traffic increase.

8. The computer implemented method of claim 1, wherein the predictions made for the first space are based on the predictions made for one or more ancestor spaces.

9. A computer implemented method of predicting inventory for web spaces in a network of spaces, comprising:

automatically generating historical inventory data for a first we space based on records of daily traffic for the first web space and descendent spaces of the first web space; and automatically predicting future inventory using a computer system for the first web space based on the historical inventory data, wherein predicting includes:

for each day in the historical inventory data, determining whether the traffic on that day is abnormally large or small by checking whether the traffic on that day is greater or less than the traffic from a day before and a day after that day by a threshold percentage;

for each day that the traffic is determined to be abnormally large or small, determining whether the traffic for a day approximately one year prior is abnormally large or small; and if traffic is not abnormally large or small the year prior, removing the traffic anomaly for that day from the historical inventory data.

10. The computer implemented method of claim 9, wherein the threshold percentage is greater than approximately 30 percent.

11. The computer implemented method of claim 9, wherein the day before is a week before and the day after is a week after that day.

12. The computer implemented method of claim 9, wherein the step of removing the traffic anomaly includes replacing the traffic for that day with the average of the traffic for that day based on the traffic a week prior and a week after.

13. A computer implemented method of predicting inventory for web spaces in a network of spaces, comprising:
    automatically generating historical inventory data for a first we space based on records of daily traffic for the first web space and descendent spaces of the first web space; and
    automatically predicting future inventory using a computer system for the first web space based on the historical inventory data, wherein predicting includes:
    identifying a second web space similar to the first web space, wherein the second web space is an antecedent of the first web space;
    removing traffic anomalies from the historical inventory data for both the first and second web spaces; and
    modeling the first web space with the second web space to determine optimization parameters; and
    predicting traffic for the first web space by applying the optimized parameters to a portion of the historical inventory data for the second web space.

14. The computer implemented method of claim 13, wherein the step of removing traffic anomalies includes, for each of the first and second web spaces:
    for each day in the historical inventory data, determining whether the traffic on that day is abnormally large or small by checking whether the traffic on that day is greater or less than the traffic from a day before and a day after that day by a threshold percentage;
    for each day that the traffic is determined to be abnormally large or small, determining whether the traffic for a day approximately one year prior is abnormally large or small; and
    if traffic is not abnormally large or small the year prior, replacing the data for that day in the historical inventory data with the average of the traffic for that day based on the traffic a week prior and a week after.

15. A computer implemented method of predicting inventory for web spaces in a network of spaces, comprising:
    automatically generating historical inventory data for a first web space based on records of daily traffic for the first web space and descendent spaces of the first web space; and
    automatically predicting future inventory using a computer system for the first web space based on the historical inventory data, wherein predicting includes:
    removing from the historical inventory data fluctuations in traffic due to holidays;
    for each day in the historical inventory data, replacing the traffic for that day with the average traffic during the week of that day; thereafter
    determining an average linear growth rate for the past based on the historical inventory data;
    computing future inventory for a plurality of days in the future by multiplying the average linear growth rate by the plurality of days to obtain a projected amount of growth in traffic for the first web space as of the plurality of days in the future relative to the present.

16. The computer implemented method of claim 15, wherein the step of determining an average linear growth rate includes:
    a) applying a linear regression process to a window of a plurality of days worth of data to calculate a slope for that window;
    b) sliding the window back in time by a second plurality of days;
    c) repeating steps a) and b) two or more times; and
    d) determining a median of the calculated slopes, whereby the median is the average linear growth rate.

17. The computer implemented method of claim 15, wherein the step of computing includes multiplying the linear growth rate by an attenuation factor.

18. The computer implemented method of claim 15, wherein the step of removing includes, for each holiday, computing a percentage change in traffic from a prior day, and wherein the method further comprises:
    for each future holiday, multiplying the projected amount of growth in traffic by the corresponding percentage change for that holiday.

19. The computer implemented method of claim 18, wherein the prior day is one week prior.

20. The computer implemented method of claim 15, wherein the step of replacing includes, for each day of the week, computing a percentage change in traffic per week that falls on that day for a plurality of weeks, and wherein the method further comprises;
    for each future day, multiplying the projected amount of growth in traffic by the corresponding percentage change for that day of the week.

21. A computer implemented method of predicting inventory for web spaces in a network of spaces, comprising:
    automatically generating historical inventory data for a first web space based on records of daily traffic for the first web space and descendent spaces of the first web space; and
    automatically predicting future inventory using a computer system for the first web space based on the historical inventory data, wherein predicting includes:
    removing traffic anomalies from the historical inventory data;
    removing fluctuations in traffic due to holidays from the historical inventory data;
    for each day in the historical inventory data, replacing the traffic for that day with the average traffic during the week of that day; thereafter
    determining a long term growth rate based on a traffic increase during a period of time; thereafter
    determining a seasonal change rate based on the determined long term growth rate and the traffic increase; thereafter
    computing future inventory for the first web space for a plurality of days in the future using the long term growth rate and the seasonal change rate.

22. The computer implemented method of claim 21, wherein the step of removing fluctuations in traffic includes, for each holiday, computing a percentage change in traffic from a prior day, and wherein the method further comprises:
    for each future holiday, multiplying the computed future inventory by the corresponding percentage change for that holiday.

23. The computer implemented method of claim 22, wherein the prior day is one week prior.

24. The computer implemented method of claim 21, wherein the step of replacing includes, for each day of the week, computing a percentage change in traffic per week that falls on that day for a plurality of weeks, and wherein the method further comprises:

for each future day, multiplying the computed future inventory by the corresponding percentage change for that day of the week.

25. The computer implemented method of claim 21, wherein the step of removing traffic anomalies includes:

for each day in the historical inventory data, determining whether the traffic on that day is abnormally large or small by checking whether the traffic on that da is greater or less than the traffic from a day before and a day after that day by a threshold percentage;

for each day that the traffic is determined to be abnormally large or small, determining whether the traffic for a day approximately one year prior is abnormally large or small; and if traffic is not abnormally large or small the year prior, replacing the data for that day in the historical inventory data with the average of the traffic for that day based on the traffic a week prior and a week after.

26. A computer implemented method of predicting inventory for web spaces in a network of spaces, comprising:

automatically generating historical inventory data for a first web pace based on records of daily traffic for the first web space and descendent spaces of the first web space; and automatically predicting future inventory using a computer system for the first web space based on the historical inventory data, wherein predicting includes:

applying a first prediction process to a first portion of the historical inventory data to determine a prediction for a second portion of the historical inventory data, wherein the first portion is earlier in time relative to the second portion;

applying a second prediction process to the first portion of the historical inventory data to determine a prediction for the second portion of the historical inventory data;

comparing the prediction results of the first and second processes with the actual data for the second portion of the historical inventory data to determine which of the first and second processes more accurately predicted the actual second portion of the historical inventory data.

27. The computer implemented method of claim 26, wherein the first process is a trend copy process, wherein the second process is a growth an seasonality separation process, and wherein the method further includes predicting future inventory using the process that more accurately predicted the actual second portion of the historic inventory data.

* * * * *